United States Patent
Tobing et al.

(10) Patent No.: US 9,421,736 B2
(45) Date of Patent: Aug. 23, 2016

(54) HYBRID PRESSURE SENSITIVE ADHESIVE

(75) Inventors: Singa D. Tobing, Hartsville, SC (US); Barry Reese, Hartsville, SC (US); Donovan Young, Hartsville, SC (US)

(73) Assignee: Sonoco Development, Inc., Hartsville, SC (US)

(*) Notice: Subject to any disclaimer, the term of this patent is extended or adjusted under 35 U.S.C. 154(b) by 826 days.

(21) Appl. No.: 13/239,815

(22) Filed: Sep. 22, 2011

(65) Prior Publication Data

US 2012/0321886 A1 Dec. 20, 2012

Related U.S. Application Data

(60) Provisional application No. 61/498,073, filed on Jun. 17, 2011.

(51) Int. Cl.
*B32B 7/12* (2006.01)
*C08K 5/101* (2006.01)
*C09D 133/08* (2006.01)

(52) U.S. Cl.
CPC ............... *B32B 7/12* (2013.01); *C09D 133/08* (2013.01); *B32B 2255/205* (2013.01); *B32B 2307/7242* (2013.01); *C08L 2201/54* (2013.01); *C08L 2201/56* (2013.01); *Y10T 428/2848* (2015.01)

(58) Field of Classification Search
CPC .............. B32B 7/12; B32B 2307/7242; B32B 2255/205; C09D 133/08; C08L 2201/54; C08L 2201/56
USPC .......................................................... 428/343
See application file for complete search history.

(56) References Cited

U.S. PATENT DOCUMENTS

| | | | |
|---|---|---|---|
| 5,412,035 A | 5/1995 | Schmitt et al. | |
| 6,270,871 B1 | 8/2001 | Scholz et al. | |
| 6,565,969 B1 * | 5/2003 | Lamon et al. | ........... 428/349 |
| 6,586,510 B1 | 7/2003 | Brown et al. | |
| 6,608,134 B1 | 8/2003 | Tobing et al. | |
| 6,803,084 B1 | 10/2004 | Do et al. | |
| 7,165,888 B2 | 1/2007 | Rodick | |
| 7,695,809 B1 | 4/2010 | Maksymkiw et al. | |
| 2001/0003765 A1 | 6/2001 | Mallya et al. | |
| 2002/0058893 A1 | 5/2002 | Vesey | |
| 2002/0119292 A1 | 8/2002 | Venkatasanthanam et al. | |
| 2003/0113519 A1 | 6/2003 | Wasserman et al. | |
| 2004/0161568 A1 | 8/2004 | Truog et al. | |
| 2005/0031233 A1 | 2/2005 | Varanese et al. | |
| 2006/0269716 A1 | 11/2006 | Hodsdon et al. | |
| 2007/0116910 A1 | 5/2007 | Polykarpov et al. | |
| 2010/0035001 A1 | 2/2010 | Arisandy et al. | |
| 2010/0087116 A1 | 4/2010 | Takahashi et al. | |

FOREIGN PATENT DOCUMENTS

| WO | 0189821 A1 | 11/2001 |
|---|---|---|
| WO | 0189821 A9 | 1/2003 |

* cited by examiner

*Primary Examiner* — Cheng Huang
(74) *Attorney, Agent, or Firm* — Banner & Witcoff, Ltd.

(57) ABSTRACT

A hybrid pressure sensitive adhesive (PSA) composition includes (i) a solvent phase comprising a first acrylic PSA dissolved in an organic solvent, an alcohol, and optionally water; and (ii) an emulsion phase comprising a second, emulsified acrylic PSA. In another aspect, a metalized film laminate includes a metalized film layer, a hybrid PSA layer, and an ink-containing polymeric film layer. The two-phase hybrid PSA system effectively addresses both metal tear and ink pick problems associated with conventional metalized film laminates.

20 Claims, 2 Drawing Sheets

HYBRID PRESSURE SENSITIVE ADHESIVE

This application claims benefit under 35 U.S.C. §119(e) to Application No. 61/498,073, filed Jun. 17, 2011, the disclosure of which is hereby incorporated by reference in its entirety.

BACKGROUND

Metalized films are widely used in flexible packaging due to their high moisture barrier property. Resealable flexible packages for soft cookies, for example, often use metalized film laminates in order to preserve the cookies' soft texture. These packages are typically made by coating a pressure sensitive adhesive (PSA) onto an ink-coated polymeric film of a material such as polyethylene terephthalate (PET), passing the web into a convection drying oven, and then laminating it onto metalized film. The laminate is stored in a roll form, slit into a proper width, and then die cut to provide the resealable feature. The die cut rolls are transported by trucks to bakeries, where packages are filled with cookies and then heat-sealed.

FIG. 1 illustrates an ideal PSA failure mode for resealable flexible packaging. The ink-coated PET film is lifted from the metalized film with no PSA residue, no ink pick-up, and minimal noise. Because the PSA remains intact, the package also has the ability to be resealed. However, in practice, a major challenge with metalized film laminates is adhesive build-up. During storage and transport, heat and humidity cause the PSA to flow deeper into the metalized film surface. This can create an uneven peel when the package is opened, which often results in film tear. When the film is torn, the package is no longer resealable and hence the package contents may become stale over time.

One way to reduce PSA flow into the metalized film surface is by using a higher cohesive PSA. Higher cohesive PSA is usually selected from acrylic polymers having higher polar functional groups such as acrylic acid, methacrylic acid, or acrylonitrile as comonomers. Post addition with metallic crosslinkers such as zinc oxide and plasticizer may further reduce adhesive build-up over time on the laminate.

Because the PSA is located between the metalized and ink surfaces, the higher cohesive strength PSA is prone to lift ink from the PET film. This can result in ink-covered PSA layers being laid down on the metalized film surface after the package is opened. As a consequence, the resealability of the package is not functional. Aging behaviors of two currently used acrylic emulsion PSAs are shown in FIG. 2. As can be seen in FIG. 2, the peel strength of these adhesives tends to increase over time, particularly under high temperature and high humidity conditions. In some cases, ink-coated PSA is transferred onto the metalized film surface when the package is opened.

Therefore, a challenge remains that either the PSA is too soft, such that it migrates into the metalized film and causes film tear, or the PSA is too cohesively strong such that it causes ink to be lifted from the PET film, leading to PSA transfer onto the metalized film layer.

Blending acrylic emulsion PSAs is well known in the art. However, when blending a soft acrylic emulsion PSA with higher cohesive strength emulsion PSA, thermodynamics dictate that the higher cohesive PSA will reside against the ink surface due to its higher polarity, while the softer PSA will dry on the air/PSA interface due to its lower polarity. When the blended PSA is laminated with a metalized film, the high cohesive PSA tends to lie down against the ink, while the soft PSA tends to lie down against the metalized film. Laminates made by blending two acrylic emulsion PSAs with these characteristics undesirably exhibited both ink pick-up and metalized film tear.

There remains a need for improved pressure sensitive adhesives for resealable packaging, particularly PSAs which can simultaneously avoid the aforementioned problems of film tear and ink pick-up associated with currently available metalized film laminates.

SUMMARY

In one aspect, a hybrid pressure sensitive adhesive composition includes (i) a solvent phase comprising a first acrylic pressure sensitive adhesive dissolved in an organic solvent, an alcohol, and optionally water; and (ii) an emulsion phase comprising an emulsified second acrylic pressure sensitive adhesive.

In another aspect, a metalized film laminate includes a metalized film layer having a first surface. A hybrid pressure sensitive adhesive layer is adhered to the first surface of the metalized film layer. The adhesive layer includes (i) a solvent phase comprising a first acrylic pressure sensitive adhesive dissolved in an organic solvent, an alcohol, and optionally water, and (ii) an emulsion phase comprising a second acrylic pressure sensitive adhesive. An ink layer is disposed on the polymeric film layer; and a hybrid pressure sensitive layer is disposed on the ink layer.

When the hybrid PSA is coated onto the ink-coated polymeric layer, the adsorption of the solvent-based polymer onto the ink is much faster than that of the emulsion-based polymer, such that the emulsion polymer stays on the top layer while the solvent-based polymer binds to the ink. Therefore, by this combination, both metal tear and ink pick problems associated with conventional metalized film laminates may be simultaneously solved.

BRIEF DESCRIPTION OF THE DRAWINGS

A more complete understanding of the present invention and certain advantages thereof may be acquired by referring to the following detailed description in consideration with the accompanying drawings, in which.

DETAILED DESCRIPTION

Aspects of the present invention are directed to hybrid pressure sensitive adhesives (PSA) which are characterized by a stable system containing a first PSA and a second PSA. The first PSA comprises a soft, solvent-phase acrylic PSA. The second PSA comprises a cohesively strong, emulsion-phase PSA. The inventors found that by selectively blending a soft acrylic solvent-based PSA with a cohesively strong acrylic emulsion-based PSA, improved PSA stratification for metalized film laminates may be achieved. While not wanting to be bound by theory, it is believed that the soft (solvent-phase) PSA layer lies down against the ink surface, while the higher cohesive (emulsion-phase) PSA layer lies down against the substrate, e.g., metalized film. This way, the problems of both film tear and ink transfer associated with presently available metalized film laminates may be avoided or minimized.

Unless otherwise clear from context, percentages referred to herein are expressed as percent by weight based on the total weight of the adhesive composition.

Figure 1:
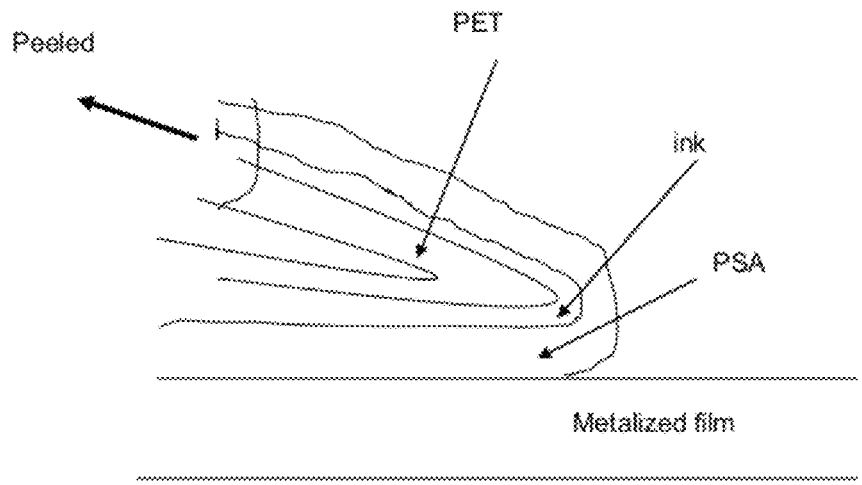
FIG. 1 is a schematic illustration of opening a resealable package by separating an ink-coated polymeric film from a metalized film.
Figure 2:
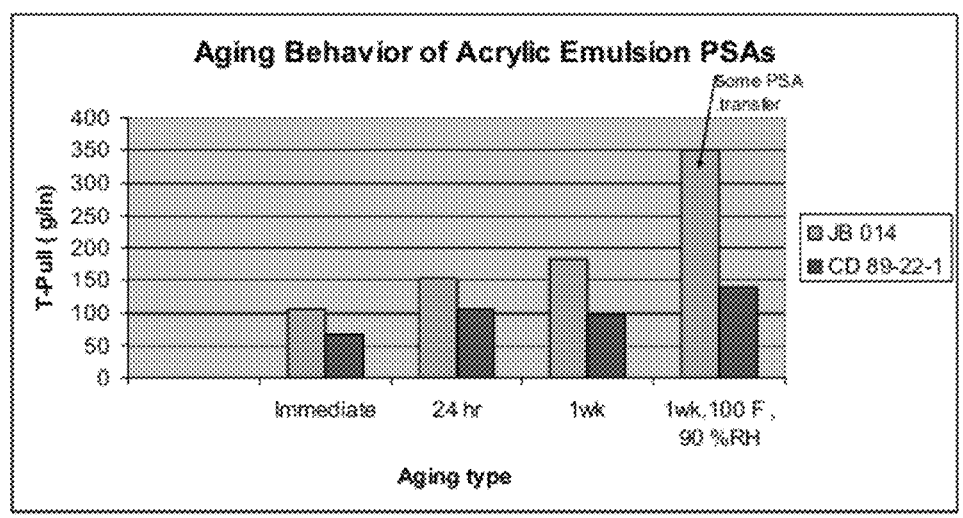
FIG. 2 is a graph showing aging behaviors of two acrylic emulsion PSAs.

With reference to FIG. 1, a metalized film laminate typically includes a metalized film layer, a pressure sensitive adhesive layer adhered to the metalized film layer, an ink layer, and a polymeric film layer (shown in FIG. 1 as "PET") disposed on the ink layer. The polymeric film layer may comprise a polyester, such as poly(ethylene terephthalate), poly(butylene terephthalate), or the like; and/or a polyolefin, such as polyethylene, polypropylene, or the like. These polymeric materials are merely provided by way of illustration; and the present invention is not limited to these particular materials.

Metalized Film Layer

Metalized film layers typically are prepared from polymeric films, such as polyethylene (including low-density polyethylene (LDPE), medium-density polyethylene (MDPE), high-density polyethylene (HPDE), high-molecular weight, high-density polyethylene (HMW-HDPE), linear low-density polyethylene (LLDPE), linear medium-density polyethylene (LMDPE)), polypropylene (PP), oriented polypropylene, polyesters such as poly(ethylene terephthalate) (PET) and poly(butylene terephthalate) (PBT), ethylene-vinyl acetate copolymers (EVA), ethylene-vinyl alcohol copolymers (EVOH), ethylene-acrylic acid copolymers (EAA), ethylene-methyl methacrylate copolymers (EMA), ethylene-methacrylic acid salts (ionomers), polyamides (nylon), polyvinyl chloride (PVC), poly(vinylidene chloride) copolymers (PVDC), polybutylene, ethylene-propylene copolymers, polycarbonates (PC), polystyrene (PS), styrene copolymers, high impact polystyrene (HIPS), acrylonitrile-butadiene-styrene polymers (ABS), and acrylonitrile copolymers (AN).

A film of the polymer may be metallized by depositing a thin layer of a metal such as aluminum, gold, silver, platinum, palladium, tin, nickel, cobalt, nickel, zinc, titanium, indium, or mixtures thereof onto the film's surface. Inorganic oxides such as $AlO_x$ (aluminum oxides), $SiO_x$ (silicon oxides), $ZnO_x$ (zinc oxides), $TiO_x$ (titanium oxides), as well as mixed metal oxides or mixed metal-Si oxides may also be vapor deposited onto the surface of the polymeric film using methods well known in the art. The vapor deposited film can be provided on at least one side of the polymeric film by a vacuum vapor deposition method (physical vapor phase growth methods, chemical vapor phase growth methods, etc.), ion plating method, sputtering method, reaction vapor deposition method, electrode beam vaporization, or the like. The vapor-deposited treatment layers can be obtained by vapor deposition techniques well known to those skilled in the art, and such techniques include physical vapor deposition (PVD) which includes thermal evaporation, electron beam deposition, inductive and/or resistive deposition, ion plating, sputtering, plasma-activated evaporation, reactive evaporation, and activated reactive evaporation; and chemical vapor deposition (CVD). Physical vapor deposition is also sometimes referred to as vacuum metallization and evaporative coating. In thermal evaporation deposition procedures, the material to be applied to the film surface (generally a metal or alloy) is heated in a high vacuum whereupon the material evaporates or sublimates and travels to the film to be coated. In sputtering processes, energetic inert ions created in a plasma discharge impact a target and cause the ejection of coating material through momentum exchange. Physical vapor deposition essentially involves the transfer of the material and the formation of coatings by physical means alone in contrast to chemical vapor deposition in which the material transfer is effected by chemical reactions induced by temperature or concentration gradients between the substrate and the surrounding gaseous atmosphere. Chemical vapor deposition usually is accomplished by vaporizing a metallic halide and decomposing or reacting the vapors at the film surface to yield the non-volatile metal on the surface of the film as a coating. The chemical reactions of vapor deposition can be effected by thermal deposition or pyrolysis, hydrogen reduction, reduction with metal vapors, chemical transport reactions, etc. The thickness of the deposited coating of inorganic oxide or metal may be, e.g., about 10 to about 500 nm, about 20 to about 200 nm, or about 30 to about 100 nm.

Solvent-Based PSA

The first adhesive may be a solvent-based acrylic PSA. Acrylics are mainly used in film and specialty paper labels because of their optical clarity, oxidative and UV-stability, and resistance to bleeding or migration into the face stock material. Acrylics are inherently tacky due to their high entanglement molecular weight ($M_e$) without the need of adding a tackifier. The monomers most frequently used in making acrylic PSAs are 2-ethyl hexyl acrylate (2EHA), n-butyl acrylate (n-BA) and isooctyl acrylate (i-OA). A variety of comonomers such as acrylic acid (AA), methyl acrylate (MA), vinyl acetate (VA), styrene (Sty), methyl methacrylate (MMA), dioctyl maleate (DOM), and others have been used to tailor the adhesive performance. Non-limiting examples of commercially available solvent-based acrylic PSAs that may be used include Gelva GMS polymer (Cytec), Aeroset (Ashland) and Duro-Tak (Henkel).

Solvent-borne acrylic PSAs may be prepared by semi-continuous solution polymerization of the above monomers using an oil-soluble initiator. Aluminum acetylacetonate (AAA) crosslinker in solution may be post-added, and the film cast undergoes a crosslinking reaction after the solvent evaporates.

The first PSA may be combined with an organic-based solvent, such as a ketone, ester, aliphatic compound, aromatic compound, glycol, glycol ether, and the like. These include methyl ethyl ketone, methyl isobutyl ketone, ethyl acetate, alkanes, cycloalkanes, benzene, hydrocarbon substituted aromatic compounds (e.g., toluene, xylenes, etc.), isoparaffinic solvents, and combinations of two or more thereof. The amount of solvent used typically ranges from about 30 to about 90 wt. %, often from about 50 to about 70 wt. %, based on the total weight of the adhesive composition. The solvent-based PSA may be used alone or in combination with one or more additional solvent-based PSAs.

Emulsion-Based PSA

The second adhesive may be an acrylic emulsion-based PSA polymer. Acrylic emulsion PSA polymers may contain from 30% to about 98% percent by weight of one or more alkyl acrylate monomers containing about 4 to about 12, or from about 4 to about 8 carbon atoms in the alkyl group, based on the total weight of the monomers. For example, the total alkyl acrylate concentration may range from about 60 to about 95% by weight based on the total weight of the monomers. Non-limiting examples of suitable monomers include isooctyl acrylate, 2-ethyl hexyl acrylate, butyl acrylate, sec-butyl acrylate, methyl butyl acrylate, 4-methyl 2-pentyl acrylate, and the like. Comonomers which can be used include unsaturated mono and dicarboxylic acids such as methacrylic acid, acrylic acid, fumaric acid and the like, dibutyl fumarate, dioctyl maleate and the like. Other comonomers include methacrylates such as methyl methacrylate, isodecyl methacrylate and the like; styrene, vinyl acetate, vinyl pyrrolidone, and the like. Non-limiting examples of commercially available emulsion-based acrylic PSAs that may be used include Gelva GME (Cytec), Aeroset (Ashland), Novacryl (Omnova), Flexcryl (Air Products), Robond (Dow), and Duro-Tak (Henkel). The emulsion-based PSA may be used alone or in combination with one or more additional emulsion-based PSAs.

The first (solvent-based) acrylic PSA and the second (emulsion-based) acrylic PSA are usually combined in a weight ratio of about 1:5 to about 5:1, often from about 1:3 to about 3:1. The hybrid PSA may be formed by mixing the solvent-based PSA, the emulsified acrylic PSA, along with an alcohol and optionally water under agitation to form a substantially uniform dispersion. The polarity of the alcohol helps to achieve a stable and uniform dispersion of the two PSA components. Suitable alcohols include straight-chained or branched lower (e.g., $C_1$-$C_6$) alcohols such as methanol, ethanol, propanol, butanol, and the like. In one embodiment, isopropanol is used. The amount of alcohol used typically ranges from about 5 to about 40 wt. %, often from about 10 to about 20 wt. %, based on the total weight of the composition. The amount of water used typically ranges from about 0 to about 20 wt. %, often from about 5 to about 10 wt. %, based on the total weight of the composition.

The components may be combined, for example, by placing the emulsion-based PSA under mild agitation, such as by using an anchor blade. Any additional water may then be added, followed by gradually adding the solvent-based PSA, which often already has crosslinker, alcohol, plasticizer and additional solvent pre-added. Mixing may be continued until a smooth, stable solution is formed.

The hybrid PSA optionally may contain one or more additives, such as those conventionally used in PSA compositions. Non-limiting examples of additives include crosslinking agents, plasticizers, film-forming enhancers, and tackifiers.

The hybrid PSA may be used to form metalized film laminates using conventional techniques. The hybrid PSA may be applied using conventional adhesive coating equipment, e.g., either by coating a continuous web or by using a gravure cylinder to facilitate a patterned coating. The resulting metalized film laminates typically exhibit a peel strength of about 20 to about 100 grams per inch. In some examples, the peel strength ranges from about 25 to about 75 grams per inch.

Figure 3:
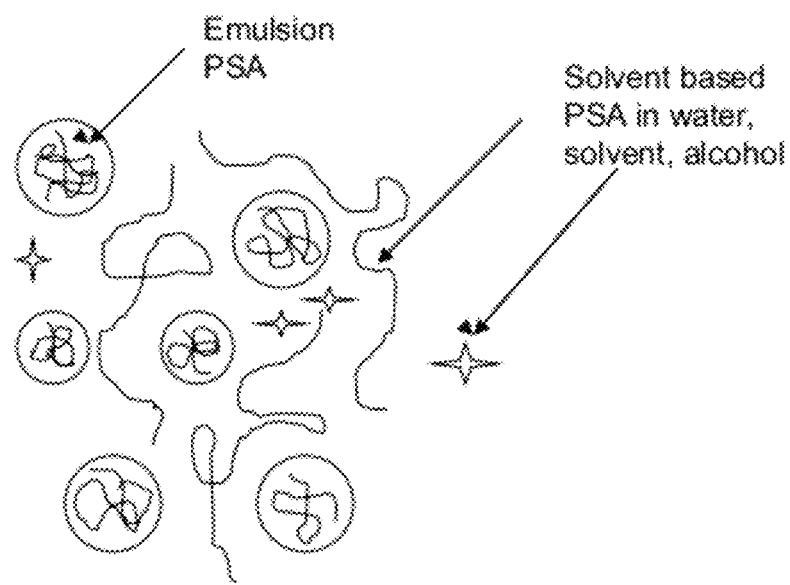
FIG. 3 is a schematic illustration of the morphology of a two-phase hybrid PSA according to one aspect of the invention.

The morphology of the hybrid PSA is shown in FIG. 3. The emulsion-based PSA is dispersed throughout the aqueous phase, which contains the solvent-borne PSA. When the hybrid PSA is coated onto an ink-coated polymeric layer, the adsorption of the solvent-based PSA onto the ink is much faster than that of the emulsion-based PSA. The emulsion-based PSA is present on the outer surface such that it preferentially adheres to the metalized film. As a result, the hybrid PSA helps to avoid or minimize the problems of both ink transfer and adhesion buildup associated with conventional metalized film laminates.

The following examples are given for purposes of illustration and should not be regarded as limiting the spirit or scope of the present invention.

Example 1

This example illustrates preparing an emulsion-based PSA. Components were combined as described below and in the amounts listed in Table 1 below. The adhesive components (Parachem PSA AC 7045, Novacryl 3797, and Novacryl PSP 170) were combined in a blender and mixed for 15 minutes. The plasticizer (K Flex 500) was then added and mixing continued for another 30 minutes. The wetting agent (Surfonyl 336) was then added slowly under agitation, and mixing continued for another 30 minutes. The biocides (AMA 415 and 38 AD) and defoamer (Fc 118-04) were then added, and mixing continued for an additional 20 minutes. Sufficient $NH_4OH$ was then added to adjust pH to 6-7. The product had a total solids content of 63 to 65 wt. %, and a viscosity of 45,000-50,000 cps.

TABLE 1

| Component | Amount (g) |
| --- | --- |
| Parachem PSA AC 7045 | 12804.8 |
| Novacryl 3797 (Omnova) | 1458.3 |
| Novacryl PSP 170 (Omnova) | 3416.8 |
| K Flex 500 (plasticizer) | 398.6 |
| Surfonyl 336 (acetylenic wetting agent) | 61.3 |
| AMA 415 (biocide) | 11.5 |
| Teknomer 38 AD (biocide) | 11.5 |
| Fc 118-04 (defoamer) | 19.2 |
| TOTAL | 18182.0 |

Example 2

This example illustrates preparing a solvent-based PSA. An acetylacetonate (AAA) solution was prepared by combining and mixing 240.4 g AAA, 390.4 g isopropyl alcohol, and 5973.8 g ethyl acetate, for a total weight of 8600.1 g.

A polymer dilution was prepared by combining and mixing 9548.1 g Eterac 77002 (solvent-based acrylic PSA based on 2EHA, MA, and AA (about 70:25:5 wt. ratio)) and 1873.3 g ethyl acetate, for a total weight of 11421.5 g.

The solvent-based PSA formulation was then prepared by combining and thoroughly mixing the components in the amounts indicated in Table 2 below. The product had a total solids content of 33 to 35 wt. %.

TABLE 2

| Component | Amount (g) |
| --- | --- |
| Polymer dilution | 11421.5 |
| Isopropyl alcohol | 4776.3 |
| AAA solution (crosslinker) | 1147.6 |
| K Flex 500 (plasticizer) | 798.3 |
| TOTAL | 18143.7 |

Example 3

This example illustrates preparing a hybrid PSA by combining the emulsion-based PSA of Example 1 and the solvent-based PSA of Example 2. Components were combined as follows and in the amounts indicated in Table 3 below. Water was added to the emulsion-based PSA with stirring for 15 minutes. The solvent-based PSA was then slowly added to the mixture under agitation. Mixing was continued until a smooth, stable solution was formed. The product had a viscosity of 800-1200 cps, and a total solids content of 43.52 wt. %.

TABLE 3

| Component | Amount (g) |
| --- | --- |
| Emulsion-based PSA (Ex. 1) | 8096.6 |
| Solvent-based PSA (Ex. 2) | 8096.6 |
| Water | 1950.4 |
| TOTAL | 18143.6 |

Example 4

This example illustrates preparing a hybrid PSA. A ZnO dispersion was slowly added into the hybrid PSA of Example 3 under mild agitation, and mixing continued for 15 minutes. The resulting product was coating-ready.

TABLE 4

| Component | Amount (g) |
| --- | --- |
| Hybrid PSA (Ex. 3) | 15626.3 |
| Bostex 422 (ZnO dispersion) | 77.1 |
| TOTAL | 15703.4 |

Metalized film laminates were prepared using this hybrid PSA. Tables 5 and 6 below report the results of tests conducted at 5 lbs./ream coat weight and 3 lbs./ream coat weight, respectively.

TABLE 5

| | Green | 24 hrs. | 1 week | 1 wk. @ 100° F., 90% R.H. |
| --- | --- | --- | --- | --- |
| T Pull (g/in) | 65 | 85 | 106 | 243 |
| Immediate reseal (g/in) | 49 | 49 | 50 | 82 |
| 30 min reseal (g/in) | 50 | 51 | 50 | 86 |
| Fast hand-pull | Clean | Clean | Clean | Clean |

TABLE 6

| | Green | 24 hrs | 1 week | 1 wk. @ 100° F., 90% R.H. |
| --- | --- | --- | --- | --- |
| T Pull (g/in) | 48 | 63 | 88 | 187 |
| Immediate reseal (g/in) | 33 | 33 | 41 | 57 |
| 30 min reseal (g/in) | 33 | 41 | 42 | 58 |
| Fast hand-pull | Clean | Clean | Clean | Clean |

As shown in Tables 5 and 6, the laminates exhibited very good PSA stratification properties, with no instances of film tear or ink transfer occurring. The laminates also exhibited good resealability.

Comparative Example 1

Laminates were prepared using single-component acrylic emulsion PSAs based on Parachem AC 7045 (higher cohesive strength acrylic PSA) and Bostik formulated acrylic emulsion PSA. Tables 7 and 8 below report the results of tests conducted at 5 lbs./ream coat weight for laminates preparing using the Parachem and Bostik adhesives, respectively.

TABLE 7

| | Green | 24 hrs. | 1 week | 1 wk. @ 100° F., 90% R.H. |
| --- | --- | --- | --- | --- |
| T Pull (g/in) | 57 | 92 | 129 | 185 |
| Immediate reseal (g/in) | 38 | 39 | 34 | 28 |
| 30 min reseal (g/in) | 39 | 39 | 40 | 34 |
| Fast hand-pull | Clean | Clean | Clean | 90% ink pick |

TABLE 8

| | Green | 24 hrs. | 1 week | 1 wk. @ 100° F., 90% R.H. |
| --- | --- | --- | --- | --- |
| T Pull (g/in) | 100 | 134 | 171 | 288 |
| Immediate reseal (g/in) | 52 | 53 | 59 | 64 |
| 30 min reseal (g/in) | 68 | 57 | 73 | 68 |
| Fast hand-pull | Clean | Clean | Clean | Metal tear |

As shown in Table 7, the laminate prepared using the cohesively stronger (Parachem) PSA exhibited significant ink transfer under the high temperature and high humidity conditions. The laminate prepared using the Bostik soft acrylic PSA exhibited metal tear when separated under these conditions.

While the invention has been described with respect to specific examples, those skilled in the art will appreciate that there are numerous variations and permutations of the above described systems and techniques that fall within the spirit and scope of the invention as set forth in the appended claims.

What is claimed is:

1. A hybrid pressure sensitive adhesive composition comprising:
    an organic solvent phase comprising a first acrylic pressure sensitive adhesive dissolved in an organic solvent and an alcohol; and
    a water-based emulsion phase comprising an emulsified second acrylic pressure sensitive adhesive.

2. The hybrid pressure sensitive adhesive of claim 1, wherein the first acrylic pressure sensitive adhesive comprises a first polymer formed of monomers selected from the group consisting of 2-ethyl hexyl acrylate, n-butyl acrylate, isooctyl acrylate, and combinations thereof.

3. The hybrid pressure sensitive adhesive of claim 2, wherein the first polymer further comprises one or more co-monomers selected from the group consisting of acrylic acid, methyl acrylate, vinyl acetate, styrene, methyl methacrylate, dioctyl maleate, and combinations thereof.

4. The hybrid pressure sensitive adhesive of claim 1, wherein the organic solvent is selected from the group consisting of ketone, ester, aliphatic compounds, aromatic compounds, glycol, glycol ether, methyl ethyl ketone, methyl isobutyl ketone, ethyl acetate, alkanes, cycloalkanes, benzene, hydrocarbon substituted aromatic compounds, isoparaffinic solvents, and combinations thereof.

5. The hybrid pressure sensitive adhesive of claim 1, wherein the emulsified second acrylic pressure sensitive adhesive comprises a second polymer formed of monomers selected from the group consisting of isooctyl acrylate, 2-ethyl hexyl acrylate, butyl acrylate, sec-butyl acrylate, methyl butyl acrylate, 4-methyl 2-pentyl acrylate, and combinations thereof.

6. The hybrid pressure sensitive adhesive of claim 5, wherein the second polymer further comprises one or more co-monomers selected from the group consisting of methacrylic acid, acrylic acid, fumaric acid, dibutyl fumarate, dioctyl maleate, methyl methacrylate, isodecyl methacrylate, styrene, vinyl acetate, vinyl pyrrolidone, and combinations thereof.

7. The hybrid pressure sensitive adhesive of claim 1, wherein the organic solvent comprises ethyl acetate.

8. The hybrid pressure sensitive adhesive of claim 1, wherein the alcohol comprises at least one straight-chained or branched lower alcohol containing from 1 to 6 carbon atoms.

9. The hybrid pressure sensitive adhesive of claim 8, wherein the alcohol comprises isopropanol.

10. The hybrid pressure sensitive adhesive of claim 1, wherein the first acrylic pressure sensitive adhesive and the emulsified second acrylic pressure sensitive adhesive are present in a weight ratio of about 1:5 to about 5:1.

11. The hybrid pressure sensitive adhesive of claim 10, wherein the weight ratio is from about 1:3 to about 3:1.

12. The hybrid pressure sensitive adhesive of claim 1, further comprising a crosslinking agent.

13. The hybrid pressure sensitive adhesive of claim 1, further comprising a plasticizer.

14. The hybrid pressure sensitive adhesive of claim 1, further comprising a film-forming enhancer.

15. The hybrid pressure sensitive adhesive of claim 1, further comprising a tackifier.

16. A metalized film laminate comprising:
    (a) a metalized film layer having a first surface;
    (b) a hybrid pressure sensitive adhesive layer adhered to the first surface of the metalized film layer, the adhesive layer comprising an organic solvent phase comprising a first acrylic pressure sensitive adhesive dissolved in an organic solvent and an alcohol and an a water-based emulsion phase comprising an emulsified second acrylic pressure sensitive adhesive;
    (c) an ink layer disposed on a polymeric film layer, wherein the hybrid pressure sensitive adhesive layer is disposed on the ink layer.

17. The metalized film laminate of claim 16, wherein the metalized film layer comprises a material selected from the group consisting of polyethylene, polypropylene, poly(ethylene terephthalate), poly(butylene terephthalate), ethylene-vinyl acetate copolymers, ethylene-vinyl alcohol copolymers, ethylene-acrylic acid copolymers, ethylene-methyl methacrylate copolymers, ethylene-methacrylic acid salts, polyamides, polyvinyl chloride, poly(vinylidene chloride) copolymers, polybutylene, ethylene-propylene copolymers, polycarbonates, polystyrene, styrene copolymers, high impact polystyrene, acrylonitrile-butadiene-styrene polymers, acrylonitrile copolymers, and combinations thereof.

18. The metalized film laminate of claim 16, wherein the polymeric film layer is selected from the group consisting of polyester, polyolefin, and combinations thereof.

19. The metalized film laminate of claim 18, wherein the polymeric film layer comprises poly(ethylene terephthalate).

20. The metalized film laminate of claim 16, wherein the hybrid pressure sensitive adhesive layer further comprises at least one additive selected from the group consisting of crosslinking agents, plasticizers, film-forming enhancers, tackifiers, and combinations thereof.

* * * * *